No. 810,414. PATENTED JAN. 23, 1906.
H. A. INMAN.
BOX COVERING MACHINE.
APPLICATION FILED MAR. 30, 1904.

5 SHEETS—SHEET 1.

WITNESSES:
Lindsley Schepmoes
F. M. Donsbach

INVENTOR
Harry A. Inman
BY
Phillips Abbott
ATTORNEY

No. 810,414. PATENTED JAN. 23, 1906.
H. A. INMAN.
BOX COVERING MACHINE.
APPLICATION FILED MAR. 30, 1904.

5 SHEETS—SHEET 2.

WITNESSES:
Lindsley Schepmoes
F. M. Donsbach

INVENTOR
Harry A. Inman
BY
Phillips Abbott
ATTORNEY

No. 810,414. PATENTED JAN. 23, 1906.
H. A. INMAN.
BOX COVERING MACHINE.
APPLICATION FILED MAR. 30, 1904.
5 SHEETS—SHEET 3.
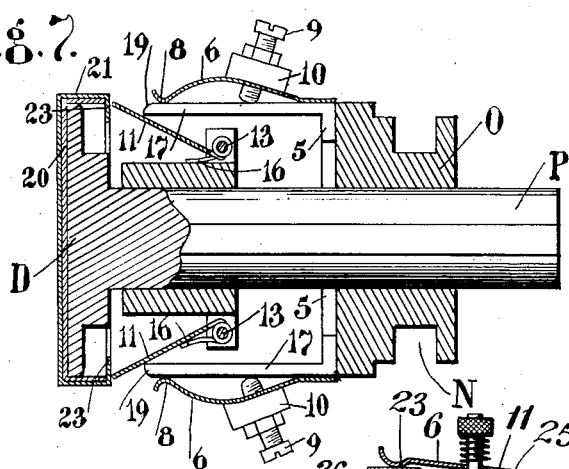
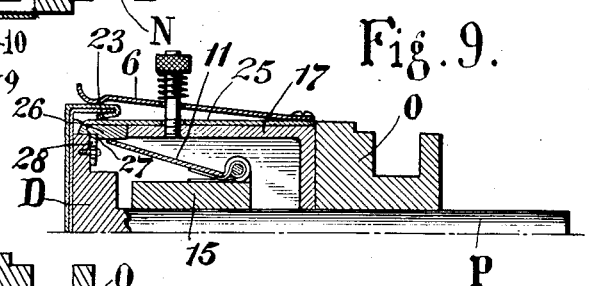
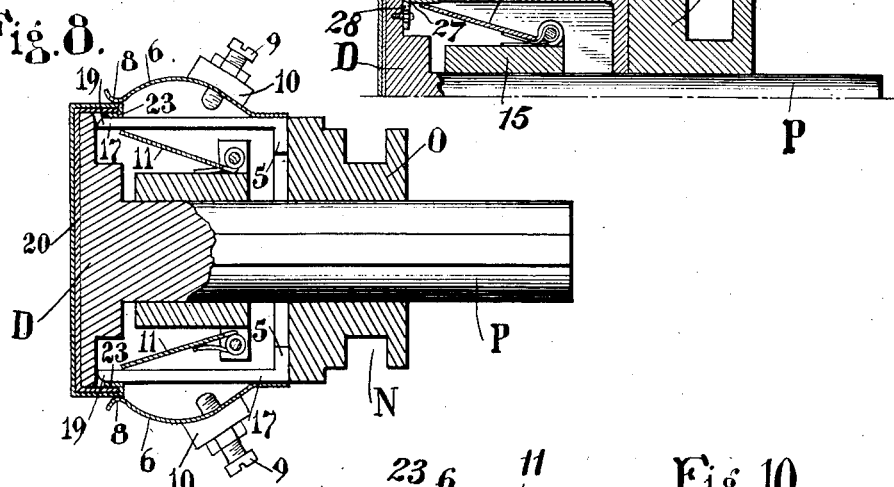
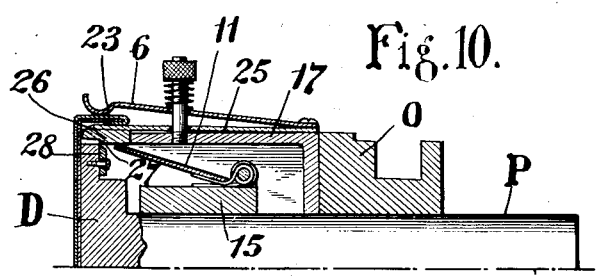

No. 810,414. PATENTED JAN. 23, 1906.
H. A. INMAN.
BOX COVERING MACHINE.
APPLICATION FILED MAR. 30, 1904.
5 SHEETS—SHEET 5.
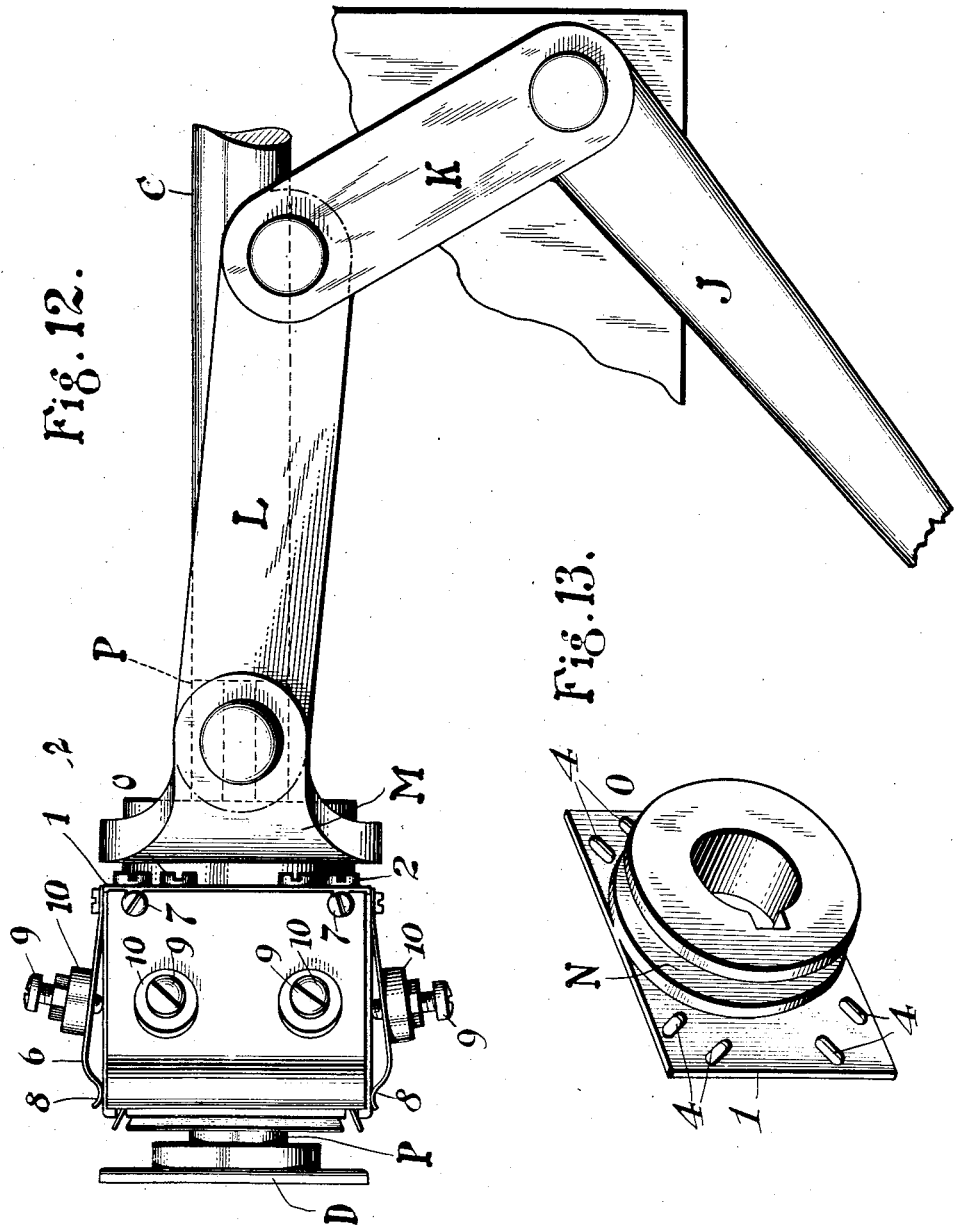
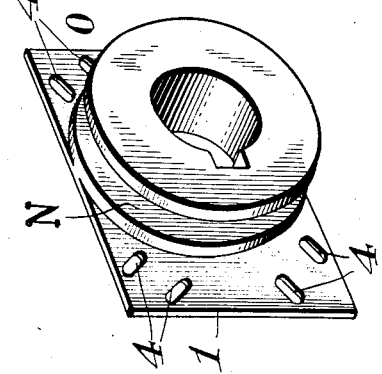

UNITED STATES PATENT OFFICE.

HARRY A. INMAN, OF AMSTERDAM, NEW YORK.

BOX-COVERING MACHINE.

No. 810,414.     Specification of Letters Patent.     Patented Jan. 23, 1906.

Application filed March 30, 1904. Serial No. 200,713.

*To all whom it may concern:*

Be it known that I, HARRY A. INMAN, a citizen of the United States, and a resident of the city of Amsterdam, county of Montgomery, State of New York, have invented a new and useful Improvement in Box-Covering Machines, of which the following is a full, clear, and exact description, reference being had to the accompanying drawings, in which—

Figure 1:
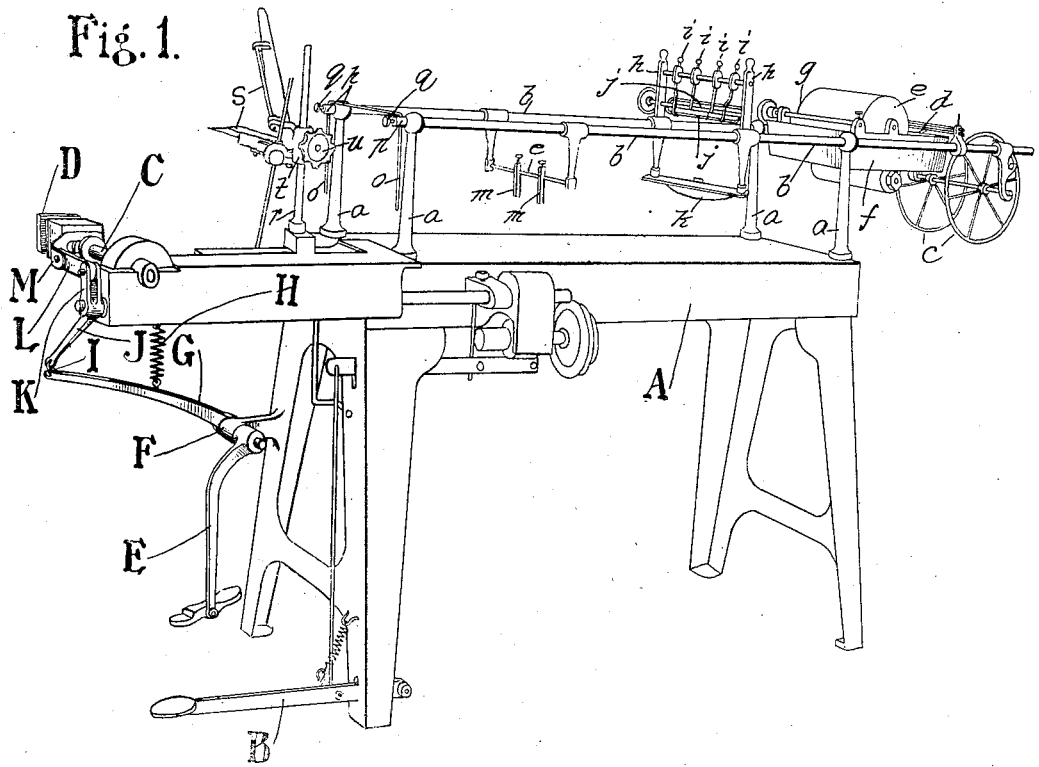
Figure 6:
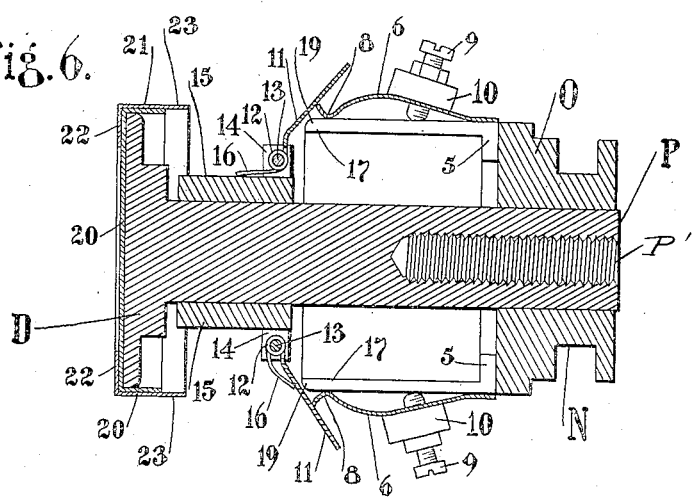
Figure 3:
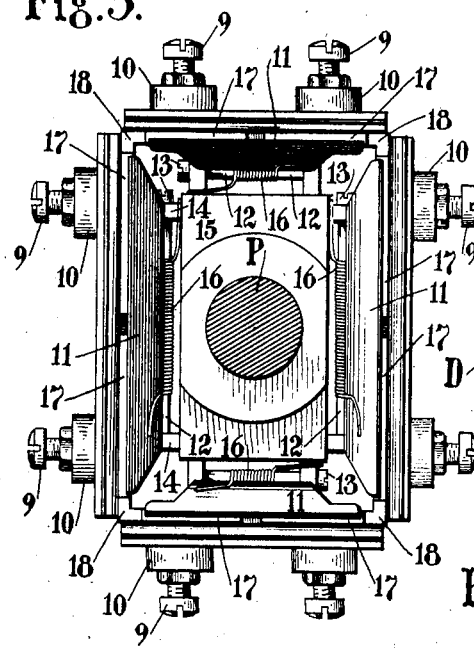
Figure 2:
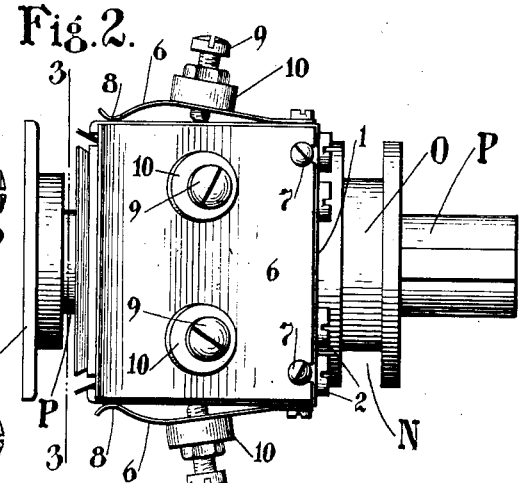
Figure 4:
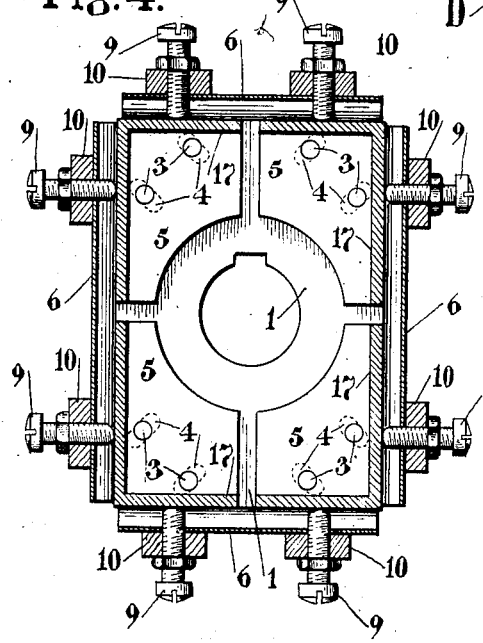
Figure 5:
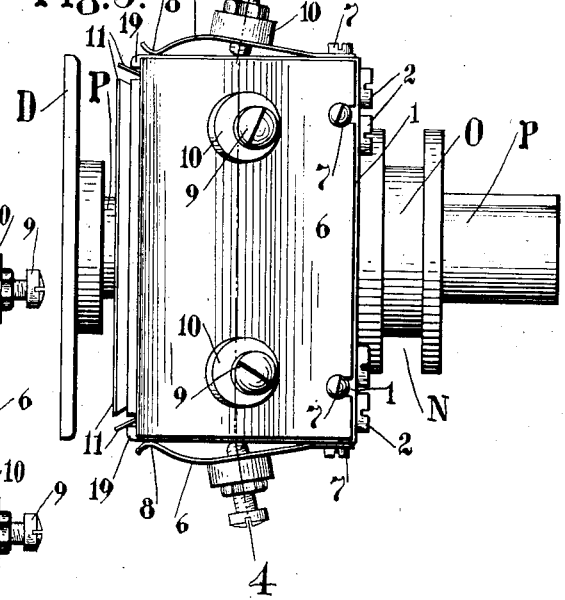
Figure 11:
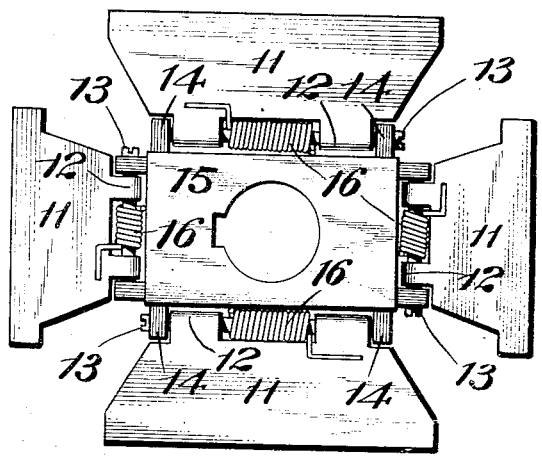

Figure 1 illustrates a perspective view of a box-covering machine having my improvement attached thereto. Fig. 2 illustrates a side elevation of the parts immediately involved in my invention. Fig. 3 illustrates a front view of the parts shown in Fig. 2, taken on the line 3 3 thereof, the box-form proper having been removed. Fig. 4 illustrates a front sectional view taken on the line 4 4 of Fig. 5. Fig. 5 illustrates an elevation similar to Fig. 2, but taken lengthwise of the parts. Fig. 6 illustrates a sectional view showing the position of the parts when the devices which effect the folding or turning in of the edges of the covering-paper are in their most retracted position. Fig. 7 illustrates a sectional view similar to Fig. 6, the devices which effect the folding or turning in of the edges of the covering-paper having been brought forwardly so as to partially turn in said edges; and Fig. 8 illustrates a sectional view similar to Fig. 7, in which the parts are in the position they occupy when the edges of the covering-paper have been fully folded or turned in and subjected to the squeezing operation of the compressing device. Fig. 9 illustrates a longitudinal sectional view of a modified construction in which yielding side plates are applied to the body or box part of the structure, whereby pressure is brought to bear upon the turned-in edge of the paper. Fig. 10 illustrates a view the same as Fig. 9, the parts being in the position they occupy when exerting pressure upon the turned-in paper. Fig. 11 illustrates a front view in detail of the block and devices thereon which support the folding-in wings, they being shown in the position they occupy during the act of closing—say about midway between the positions shown in Figs. 6 and 7. Fig. 12 illustrates an enlarged view, as compared with the other drawings, of an end elevation of the portion of the machine at the left in Fig. 1, showing the lever-and-link devices whereby the folding-in mechanism is longitudinally moved upon the shaft proper. Fig. 13 illustrates a detail in perspective of a portion of the sliding folding-in mechanism.

My invention relates to that part of a box-covering machine known as the "box-form;" and it consists in the addition to the box-form of mechanism which, coacting with the box-form proper, effects the turning in of the edges of the covering-paper from the outside to the inside of the box or its cover and securely fastens the same upon the inside thereof by pressure applied between suitable surfaces, and the devices so operate that the turning in of the paper is effected without rupturing it, thus producing good smooth handsome work at the corners of the box.

In the example illustrated in the drawings I show a well-known form of box-covering machine called the "Inman" machine and also show the invention as operating in conjunction with a box-cover. It will, however, be understood that my invention is applicable to practically all forms of box-covering machines, suitable changes in the detail being made, if required, and that the invention is applicable to turning in the covering-paper on boxes as well as covers.

In Fig. 1, A represents the covering-machine proper. They are so well known that a brief description only is necessary—that is to say, a table or framework, as shown, is suitably supported upon legs or otherwise, and from the upper parts of the table rise pillars or standards $a$, which in turn support longitudinally-running bars $b$, on the ends of which, as at $c$, is the reel or reels which contain the coils of covering-paper. $d$ represents guide and tension bars. $e$ is the rotary glue-roller revolving in a glue-tank $f$, which may be heated in any suitable manner. $g$ is an adjustable scraper. $h$ represents uprights which support the guiding-fingers $i\ i\ i\ i$, whereby and in conjunction with the horizontal bars $j\ j$ the papers are guided and, if more than one strip of paper be used, caused to overlap each other in a manner well understood. $k$ is a support for a drip-pan, if such be required. $l$ is the uniting-bar, with its guiding-fingers $m$. $n$ is the support-bar, provided with extensions $o\ o$, which pass through holes made in the studs $p\ p$, provided with set-nuts $q\ q$, whereby the support-bar can be vertically adjusted as the size of the box or cover requires. $r$ is a standard upon which is mounted the shears $s$, made vertically adjustable on the standard by hub $t$ and set-nut $u$. Returning now to the consideration of the parts more immediately involved in this invention, B is the treadle device whereby the power which drives the machine is applied. C is the shaft proper, upon the end of which the box-form D is attached, as usual. In the present instance I illustrate the box-form and the parts which constitute my invention as applicable to a rather small box or its cover—say, for example, a cover two by three inches in size—but it will be readily understood that the size is immaterial. E is a treadle, preferably operated by the left foot of the operator. It is pivoted, as shown, upon a suitable support F, preferably connected with the frame of the machine. G is an arm integral with or rigidly connected to the treadle E. H is a retracting-spring which tends always to return it to normal position. I is a link which connects the arm G with one arm J of a bell-crank lever, the other arm K whereof connects by a link L with a yoke M, which is received within the groove N (see Figs. 2 and 13) in a block O, which is splined to a shaft P, which is the interchangeable section of the shaft proper, C, so that it has longitudinal movement thereon and rotary movement therewith. The shaft P supports on its forward end the box-form D, which is rotated intermittently by the driving mechanism of the machine in a manner now well understood, and the parts which constitute the folding or turning-in devices of this invention slide backwardly and forwardly upon the shaft P, effecting their operation upon the covering-paper in a manner about to be described. The interchangeable section P of the shaft C may be readily connected and disconnected therefrom by a threaded stem P', (see Fig. 6,) with which a correspondingly-threaded part on the shaft proper, C, engages.

Referring now to the parts which constitute the folding or turning-in devices, a plate or flange 1 is formed on the front end of the casting or block O, and at each of its corners two screws 2 2 (see Figs. 4 and 12) pass through slotted openings 4 4 in the plate or flange and thread into threaded holes 3 3 in brass corner-plates 5 5, whereby they, through the instrumentality of the slots 4 4, are made adjustable radially from the center of the shaft P, so that exact coincidence between the exterior surfaces of these brass corner-plates and the interior sides of the box or cover can be secured. The said adjustment is desirable to secure the most perfect adhesion of the turned-in covering-paper with the inside of the box or cover. 6 6 (see Fig. 2) are spring compressing-plates, which are connected by screws 7 7 to the edges of the plate 1, and they are given such curvature that they normally tend to press at their forward ends, as at 8 8, against the sides of the corner-plates 5 5, above referred to, and the pressure exerted by these pressure-plates is regulated by the set-screws 9 9, which pass through threaded bosses 10 10, attached to the spring-plates, so that by running the screws in or out the free ends of the springs may be adjusted toward and from the corner-plates 5, and thus their pressure upon the work may be accurately regulated.

Referring now more particularly to Figs. 3, 6, 7, and 8, 11 11 are what I term the "paper turning-in or folding wings." They are sleeved, as at 12 12, upon short bars 13, supported upon studs 14, which are fastened to a block 15, which is immovably mounted upon the interchangeable shaft P. A spring 16 encircles each of the short bars 13, one end of which rests against the block 15 and the other against the turning-in wings 11, whereby the wings are normally thrown outwardly and backwardly, as illustrated. The forwardly-projecting flanges or webs 17 of the brass corner-plates 5 at their extreme front edges form, as heretofore stated, the interior compression-surfaces whereby the turned-in paper is pressed firmly upon and adhered to the inside of the box or cover. The compression-springs themselves at their forward ends (indicated at 8) serve as the exterior compression-surfaces. In order that the turned-in edges of the covering-paper may be as smooth and handsome as possible at the corners, and also in order that rupture of the paper at this point may be avoided, I prefer to cut away the forward edges of the compression-flanges 17 at their corners, as shown at 18, (see Fig. 3,) and I also reduce the length of the turning-in wings 11 11, so that they are somewhat shorter than the interior compression-surfaces 17, as shown likewise in Fig. 3. By cutting away these corners 18, as stated, or at least reducing the compression-surfaces 17 at the corners, the covering-paper during the act of turning in its projecting edge is free and untrammeled in its movements at the corners, whereby it bends inwardly under the action of the turning-in wings in such folds or pleats as present the least resistance, so that strains upon it at the corners where tearing is most likely to occur is reduced to the minimum, and I also, as shown in Figs. 6, 7, and 8, round off the outer surfaces of the compression-flanges 17, as shown at 19, so that when the covering-paper has been folded inwardly and has passed between the squeezing-surfaces 17 on the inside and 8 on the outside these rounded surfaces 19 will avoid rupture or tearing of the paper.

The operation is as follows, special reference being had to Figs. 6, 7, and 8: At the commencement of the operation the turning-in devices are in the position shown in Fig. 6—that is to say, the sliding block O, carrying the interior compression-surfaces 17 and the exterior compression-springs 6, is in its most retracted position upon the revolving box-form shaft P, and when in this position the springs 16, acting upon the turning-in wings 11, have projected them all outwardly and backwardly, so that they occupy the position shown in Fig. 6 removed from and out of the way of the box-form. The box or cover blank 20 is then placed upon the box-form, the machine is started, and the covering-paper 21 is applied to the exterior of the box or cover in the usual way, during which operation the covering-paper is turned down on the outside of the box or cover, as shown at 22, by one hand of the operator in a manner well known, leaving, however, the other edge 23 of the covering-paper projecting forwardly in the manner shown in Fig. 6. As soon as the application of the covering-paper to the box or cover has been completed the treadle E is operated, whereupon the block O, through the instrumentality of the said treadle and its coacting levers, links, &c., is moved forward, sliding longitudinally on the box-form shaft P, as shown in Fig. 7, and during its movement the forward edges of the compression-surfaces 17, which rest against the rear surface of the folding-in wings 11, rock them upon their axes 13, thereby increasing the tension of the springs 16, and as these turning-in wings 11 fold inwardly they come in contact with the projecting edges 23 of the covering-paper and bend them all inwardly, as shown in Fig. 7. Continued movement in the same direction of the turning-in devices causes the front edge of the box or cover (which is held to the box-form by the hand of the operator) to pass between the rounded corners 19 of the interior compression-surfaces 17 and the outwardly-curved edges of the exterior spring compression-surfaces 8 until the parts assume the position shown in Fig. 8, and it will be noted that during this movement the front edges of the compression-surfaces 17 have completed the turning in of the edge 23 of the covering-paper and that it is subjected to a squeezing operation between the said compression-surfaces—to wit, the part 17 on the inside and the part 8 on the outside. The above having taken place, the treadle E is released and the retractile spring H thereupon immediately returns all parts to their primary position, as shown in Fig. 6, the box or cover is lifted off from the box-form, and a new one is applied thereto for a repetition of the operation.

It sometimes happens that with certain kinds of adhesive material and certain kinds of paper-stock, particularly if the machine is run rapidly, the adhesion between the inturned edge of the covering-paper and the inside of the box or cover is not immediate or strong enough to prevent an outward turning of the paper when the box or cover is removed from the apparatus. In order to obviate this, I sometimes modify the construction, as shown in Figs. 9 and 10, in which the parts are generally the same as heretofore described, but instead of having the terminal parts of the compression-surfaces or side plates 17 rigid I reduce their length somewhat and mount upon their outer surface on each of the four sides of the structure a spring-plate 25, secured at its rear edge by screws, as shown, upon the front edge of which I attach a cross-bar 26, a shoulder 27 on the under side of which engages with the beveled outer edge of a block or strip 28, fastened to the box-form D. This same arrangement for the spring-plate 25 with their cross-bars 26 and the beveled block 28 extends, as stated, around all four sides of the structure, so that when the device is in operation the forward movement of the turning-in mechanism will operate as shown in these two views Figs. 9 and 10. The cross-bars, however, do not extend entirely to the corners, but cease some little distance therefrom, so as not to interfere with the folding and inturning of the paper in the vacant spaces left at each corner, as heretofore fully described. In Fig. 9 the parts are in the position they occupy just prior to the time that the turning-in devices reach their ultimate forward movement. In Fig. 10 the parts have reached their ultimate forward movement, and it will be observed that the shoulders 27 on the cross-bars 26, having engaged with the inclined surface of the blocks 28, are forced outwardly, exerting a considerable squeezing pressure upon the inturned edge of the covering-paper, so that it is firmly clamped between the bars 26 on the inside and the spring 8 on the outside. Thus adhesion between the covering-paper and the box or cover is almost immediately secured, and there is no backward turning or outward movement thereof upon the retraction of the parts. When I employ the construction shown in these two figures, I prefer to make the spring-plate 8 flatter than in the other construction, as shown.

As heretofore stated, the drawings hereof illustrate a small and shallow cover as the subject operated upon, and in some of the figures, noticeably in Fig. 8, the front edges of the interior compression-surfaces 17 are shown as having moved quite close up to the box-form D, and also it would appear as though the cover could not be removed from the box-form because of the inturned edge 23 of the covering-paper. It is impossible to make the part of sufficient size to be perceptible in a drawing without this appearing. As a matter of fact, as will be understood by those familiar with this art, the box-form does not fit the interior of the box or cover with such snugness, nor is the covering-paper of such thickness as to in any wise interfere with the stated operation, and it will also be understood that when larger or deeper covers or boxes are to be operated upon the turning-in devices above described will not move so far as to come in contact with or, indeed, anywhere near the rear side of the box-form. This is immaterial, however, because sometimes the box-forms are made thick, sometimes thin, sometimes the inturning of the paper is considerable, sometimes a narrow edge or strip only is sufficient, so that all this matter will be dependent upon the adjustment of the machine, the preference of the operator, and the character of work desired.

It will be obvious to those who are familiar with this art that the details of construction and operation of the parts described and illustrated in this specification and its drawings may be very extensively modified and still the essence of the invention retained. I do not, therefore, limit myself to such details except as hereinafter claimed and wish it understood that the parts as described and illustrated herein show one form or construction only in which my invention may be embodied.

Having described my invention, I claim—

1. The combination of a box-form, exterior and interior compressing-plates, means for slidably supporting the plates in line with the box-form, means for moving the plates toward and from the box-form, turning-in wings and means for yieldingly supporting said wings in the line of movement of the compressing-plates, for the purposes set forth.

2. The combination of a box-form, exterior and interior compressing-plates, means for slidably supporting the plates in line with the box-form, means for moving the plates toward and from the box-form, pivoted turning-in wings and means to close them inwardly during their movement toward the box-form, for the purposes set forth.

3. The combination of a box-form, rigid interior compressing-plates and elastic exterior compressing-plates, means for slidably supporting the compressing-plates in line with the box-form, means for moving said plates toward and from the box-form, and turning-in wings in the line of movement of said compressing-plates, for the purposes set forth.

4. The combination of a box-form, interior and exterior compressing-plates, means for slidably supporting the plates in line with the box-form, means for moving the plates to and from the box-form, and turning-in wings in the line of movement of said compressing-plates provided with springs, for the purposes set forth.

5. The combination of a shaft, a box-form on the shaft, interior and exterior compressing-plates also mounted upon said shaft and rotating therewith, means for slidably supporting the compressing-plates in line with the box-form, means for moving said plates toward and from the box-form, and turning-in wings in the line of movement of the compressing-plates, for the purposes set forth.

6. The combination of a shaft, a box-form mounted thereon, a block adapted to longitudinal movement upon the shaft and rotary movement therewith, exterior and interior compressing-plates supported on said block, means to move the block toward and from the box-form, and turning-in wings in the line of movement of the compressing-plates, for the purposes set forth.

7. The combination of a box-form, adjustable interior and elastic exterior compressing-plates, means for moving said plates, means for slidably supporting said plates in line with the box-form, movable turning-in wings and means to move them into engagement with the projecting edges of the covering-paper and to carry them inwardly, for the purposes set forth.

8. The combination of a box-form, interior and exterior compressing-plates, means for moving said plates, means for slidably supporting said plates in line with the box-form, and pivoted turning-in wings arranged to close and move within the interior compressing-plates, for the purposes set forth.

9. The combination of a box-form, pivoted turning-in wings, springs arranged to project the wings outwardly and rearwardly away from the box-form, movable exterior and interior compressing-plates arranged to make contact with and close the turning-in wings, and means to slide said compressing-plates toward and from the box-form, for the purposes set forth.

10. The combination of a box-form, movable interior and exterior compressing-plates, the interior plates having their corners reduced, pivoted turning-in wings in the line of movement of the compressing-plates and means to slide the compressing-plates toward and from the box-form, for the purposes set forth.

11. The combination of a box-form, interior compressing-plates the corners whereof are reduced, exterior elastic and adjustable compressing-plates, said compressing-plates being all arranged approximately in line with the edge of the box or cover, and turning-in wings constructed and arranged to turn in the projecting edges of the covering-paper before the compressing-plates act upon them, and means to move the compressing-plates toward and from the box-form and to operate the turning-in wings, for the purposes set forth.

12. The combination of a box-form, turning-in wings constructed and arranged to engage the projecting edges of the covering-paper and turn them inwardly, interior and exterior compressing-plates, means to move them toward and from the box-form, means for pressing the interior compressing-plates outwardly as they approach the limit of their forward movement and devices on the exterior compressing-plates to resist the outward pressure of the interior compressing-plates, for the purposes set forth.

13. The combination of a box-form, turning-in wings constructed and arranged to engage the projecting edges of the covering-paper and turn them inwardly, interior compressing-plates and elastic exterior compressing-plates, means to slide said compressing-plates toward and from the box-form and means to press outwardly the interior compressing-plates as they approach the limit of their forward movement, for the purposes set forth.

In testimony whereof I have signed my name to this specification in the presence of two subscribing witnesses.

HARRY A. INMAN.

Witnesses:
 CHAS. W. CLARK,
 RALPH A. WOOD.